United States Patent
Kita et al.

(10) Patent No.: US 8,105,424 B2
(45) Date of Patent: Jan. 31, 2012

(54) HYDROGEN PERMEATION/SEPARATION THIN MEMBRANE

(75) Inventors: Koichi Kita, Nishinoniya (JP); Kiyoshi Aoki, Hokkaido (JP); Kazuhiro Ishikawa, Hokkaido (JP)

(73) Assignee: Mitsubishi Materials Corporation, Tokyo (JP)

( * ) Notice: Subject to any disclaimer, the term of this patent is extended or adjusted under 35 U.S.C. 154(b) by 487 days.

(21) Appl. No.: 12/281,663

(22) PCT Filed: Mar. 8, 2007

(86) PCT No.: PCT/JP2007/054552
§ 371 (c)(1),
(2), (4) Date: Sep. 4, 2008

(87) PCT Pub. No.: WO2007/105594
PCT Pub. Date: Sep. 20, 2007

(65) Prior Publication Data
US 2009/0056549 A1 Mar. 5, 2009

(30) Foreign Application Priority Data

Mar. 8, 2006 (JP) ................................. 2006-062922
Mar. 8, 2006 (JP) ................................. 2006-062923

(51) Int. Cl.
*B01D 53/22* (2006.01)
(52) U.S. Cl. ....... 96/4; 95/56; 96/11; 55/524; 55/DIG. 5
(58) Field of Classification Search ............... 55/DIG. 5, 55/524; 96/4, 11; 95/56
See application file for complete search history.

(56) References Cited

U.S. PATENT DOCUMENTS

2005/0217480 A1 10/2005 Aoki et al.
2006/0070524 A1* 4/2006 Inoue et al. .......................... 96/4

FOREIGN PATENT DOCUMENTS

| EP | 0015428 A1 | 9/1980 |
| EP | 1 566 457 A1 | 8/2005 |
| JP | 2005232491 | 9/2005 |
| WO | WO 2004073844 A1 * | 9/2004 |

OTHER PUBLICATIONS

Hayashi et al., Ni-Ti-Nb Gokin No Suiso Toka Tokusei, The Japan Institute of Metals Keen Gaiyo, 2003, vol. 132, p. 345, Japan (Previously submitted).
European Search Report dated May 27, 2009 for the corresponding European patent application No. 07738042.6 (Previously submitted).
International Search Report mailed Jun. 19, 2007 for the corresponding PCT application No. PCT/JP2007/054552 (Previously submitted).

* cited by examiner

Primary Examiner — Jason M Greene
Assistant Examiner — Anthony Shumate
(74) *Attorney, Agent, or Firm* — Leason Ellis LLP

(57) ABSTRACT

A hydrogen permeation/separation thin membrane including a Ni—Ti—Nb alloy. The Ni—Ti—Nb alloy is a cast foil material obtained by roll quenching and a refining heat treatment. The membrane has a thickness of 0.07 mm or less. The Ni—Ti—Nb alloy has the following: (a) a composition consisting of 10 to 47 atomic % of Nb, 20 to 52 atomic % of Ti, and a remainder containing 20 to 48 atomic % of Ni and inevitable impurities; and (b) an alloy structure where fine particles of a Nb-based solid solution alloy, in which Nb forms a solid solution with Ni and Ti in Nb, are dispersed in a basic structure made of a Ni—Ti(Nb) intermetallic compound formed of a solid solution of a Ni—Ti intermetallic compound, in which part of Ti thereof is replaced by Nb.

6 Claims, 3 Drawing Sheets

HYDROGEN PERMEATION/SEPARATION THIN MEMBRANE

CROSS-REFERENCE TO PRIOR APPLICATION

This is the U.S. National Phase Application under 35 U.S.C. §371 of International Patent Application No. PCT/JP2007/054552 filed Mar. 8, 2007, which claims the benefit of Japanese Application Nos. 2006-062922 filed Mar. 8, 2006 and 2006-062923 filed Mar. 8, 2006, all of which are incorporated by reference herein. The International Application was published in Japanese on Sep. 20, 2007 as WO 2007/105594 A1 under PCT Article 21(2).

TECHNICAL FIELD

The present invention relates to a hydrogen permeation/separation thin membrane constituted of an Ni—Ti—Nb alloy or Nb—Ti—Ni alloy having high mechanical strength, and thus can be made into a thin membrane having a thickness of 0.07 mm (70 μm) or less, and in which, as a result, hydrogen permeation/separation performance can be significantly improved when applied in practical use due to its thinness.

BACKGROUND ART

In recent years, high purity hydrogen gas has drawn attention as a fuel gas used in energy systems such as hydrogen fuel cells and hydrogen gas turbines. It is known that the high purity hydrogen gas is produced from a hydrogen-containing source gas such as a mixed gas obtained by electrolyzing water or a mixed gas obtained by steam reforming liquefied natural gas (LNG) due to the following process by employing a high-performance hydrogen purifier like that shown in the schematic diagram in FIG. 5. The purifier is partitioned into a left-hand chamber and a right-hand chamber by a hydrogen permeation/separation membrane, which is made of a material permeable only to hydrogen and which has a thickness of 0.1 to 3 mm, and is reinforced at the periphery with a frame body made of nickel or the like. A hydrogen-containing source gas inlet tube and an exhaust gas outlet tube are installed in the left-hand chamber, whereas a high purity hydrogen gas outlet tube is installed in the right-hand chamber. A reaction chamber made of a material such as stainless steel is provided at the center of the purifier. The reaction chamber is heated to 200 to 300° C. and the hydrogen-containing source gas is introduced from the inlet tube. While maintaining the internal pressure of the right-hand chamber where the hydrogen separated/purified by the hydrogen permeation/separation membrane is present at 0.1 MPa and the internal pressure of the left-hand chamber where the hydrogen-containing source gas is present at 0.2 to 0.5 MPa, the high purity hydrogen gas is produced by a separation/purification process due to the hydrogen permeation/separation membrane.

In addition, the wide use of the abovementioned hydrogen permeation/separation membrane in the chemical reaction processes including the steam reforming process of hydrocarbons and the hydrogenation/dehydrogenation processes such as the reaction between benzene and cyclohexane where hydrogen is selectively transferred is also well known.

Moreover, it is also known that the abovementioned hydrogen permeation/separation membrane is constituted from an Ni—Ti—Nb alloy having the following composition (α) and alloy structure (β):

(α) a composition consisting of 25 to 45 atomic % of Ni, 26 to 50 atomic % of Ti, and a remainder containing Nb and inevitable impurities (with the proviso that the Ni content is 11 to 48 atomic %); and (β) with respect to a cast thin plate cut out from a cast ingot by electrical discharge machining and having a thickness of 0.1 to 3 mm, an alloy structure which has a eutectic microstructure of a solid solution of Ni in an NbTi phase and a solid solution of Nb in an NiTi phase, and also has a primary NbTi phase (white islands seen in FIG. 4) dispersed in the microstructure as shown in the photographs of structures in FIGS. 2 and 4 taken by a scanning electron microscope (magnification: 2500× in FIGS. 2 and 4000× in FIG. 4).

[Patent Document 1] Japanese Unexamined Patent Application, First Publication No. 2005-232491

The demands for various chemical reactors with higher performance including the above high-performance hydrogen purifier are extremely high. Accordingly, even higher performance in the hydrogen permeation/separation is required for the hydrogen permeation/separation membrane used as a structural member in the aforementioned reactors. In addition, when the aforementioned hydrogen permeation/separation membrane is used, since it is known that its hydrogen permeation/separation performance generally improves as its membrane thickness is reduced, studies concerning the development of highly strong Ni—Ti—Nb alloy that constitutes the aforementioned hydrogen permeation/separation membrane have been conducted intensively. However, since the Ni—Ti—Nb alloy that constitutes the conventional hydrogen permeation/separation membranes has insufficient mechanical strength, the thickness of the membrane could not be reduced to 0.1 mm or less, and thus satisfactory improvement in the hydrogen permeation/separation performance has currently not been achieved.

BRIEF SUMMARY OF THE INVENTION

From the abovementioned viewpoints, the present inventors conducted a study in order to achieve the above various chemical reactors with higher performance while particularly focusing on the achievement of a highly strong hydrogen permeation/separation membrane in order to achieve a thin hydrogen permeation/separation membrane, which is a structural member of the reactors, and obtained the following research results.

That is, the composition of the aforementioned hydrogen permeation/separation membrane is first specified as Nb of 10 to 47 atomic %, Ti of 20 to 52 atomic %, and a remainder containing Ni and inevitable impurities (with the proviso that the Ni content is 20 to 48 atomic %), and a molten alloy having the aforementioned composition is made into a cast foil material having a thickness of 0.07 mm or less by roll quenching. When this cast foil material is subjected to a refining heat treatment in an inert gas atmosphere or a vacuum atmosphere in order to prevent oxidation and under the condition where the material is heated to and retained at a temperature of 300 to 1100° C. for a predetermined time, the resulting material subjected to the refining heat treatment will have an alloy structure as shown in the structural photograph of FIG. 1 taken by a scanning electron microscope (magnification: 2,500×) where fine particles of an Nb-base solid solution alloy (seen as the white parts in FIG. 1) formed of a solid solution of Ni and Ti in Nb are dispersed in a microstructure (seen as the black parts in FIG. 1) made of an Ni—Ti(Nb) intermetallic compound formed of a solid solution of an Ni—Ti intermetallic compound, in which part of the Ti is replaced by Nb. The Ni—Ti—Nb alloy having the above alloy structure has an extremely high mechanical strength, and thus when practically applied as a hydrogen permeation/separation membrane, the membrane having a thickness of 0.07 mm or less can be achieved and the membrane exhibits even higher performance in the hydrogen permeation/separation for a long time.

Moreover, the present inventors also obtained the following research results.

That is, the composition of the aforementioned hydrogen permeation/separation membrane is first specified as Ni of 10 to 32 atomic %, Ti of 15 to 33 atomic %, and a remainder containing Nb and inevitable impurities (with the proviso that the Nb content is 48 to 70 atomic %), and a molten alloy having the aforementioned composition is made into a cast foil material having a thickness of 0.07 mm or less by roll quenching. When this cast foil material is subjected to a refining heat treatment in an inert gas atmosphere or a vacuum atmosphere in order to prevent oxidation under the condition where the material is heated to and retained at a temperature of 300 to 1,100° C. for a predetermined time, the resulting material subjected to the refining heat treatment will have an alloy structure as shown in the structural photograph of FIG. 3 taken by a scanning electron microscope (magnification: 4,000×) where fine particles of an Ni—Ti(Nb) intermetallic compound (seen as the black parts in FIG. 3), formed of an Ni—Ti intermetallic compound in which a part of the Ti thereof is replaced by Nb, are dispersed in a microstructure (seen as the white parts in FIG. 3) made of an Nb-base solid solution alloy formed of a solid solution of Ni and Ti in Nb. The Nb—Ti—Ni alloy having the above alloy structure ensures excellent performance in hydrogen permeation/separation due to the Nb-base solid solution alloy of the microstructure and also has an extremely high mechanical strength due to the dispersion of the fine particles of the Ni—Ti(Nb) intermetallic compound in the microstructure. Accordingly, when practically applied as a hydrogen permeation/separation membrane, the membrane having a thickness of 0.07 mm or less can be achieved, and the improvement in hydrogen permeation/separation performance due to the achievement of thin membrane together with the excellent hydrogen permeation/separation performance exhibited by the microstructure of the Nb-based solid solution alloy will result in even higher performance in the hydrogen permeation/separation.

The present invention is made based on the above research results and provides a hydrogen permeation/separation thin membrane made of an Ni—Ti—Nb alloy characterized in that the Ni—Ti—Nb alloy is a cast foil material obtained by roll quenching and having a thickness of 0.07 mm or less, which has been subjected to a refining heat treatment, and has the following composition (a) and alloy structure (b) (hereafter, this membrane is frequently referred to as a "hydrogen permeation/separation thin membrane (I)"):

(a) a composition consisting of 10 to 47 atomic % of Nb, 20 to 52 atomic % of Ti, and a remainder containing 20 to 48 atomic % of Ni and inevitable impurities; and (b) an alloy structure where fine particles of an Nb-base solid solution alloy formed of a solid solution of Ni and Ti in Nb are dispersed in a microstructure made of an Ni—Ti(Nb) intermetallic compound formed of a solid solution of an Ni—Ti intermetallic compound, in which part of the Ti thereof is replaced by Nb.

Further, the present invention also provides a hydrogen permeation/separation thin membrane made of an Nb—Ti—Ni alloy characterized in that the Nb—Ti—Ni alloy is a cast foil material obtained by roll quenching and having a thickness of 0.07 mm or less, which has been subjected to a refining heat treatment, and has the following composition (a') and alloy structure (b') (hereafter, this membrane is frequently referred to as a "hydrogen permeation/separation thin membrane (II)"):

(a') a composition consisting of 10 to 32 atomic % of Ni, 15 to 33 atomic % of Ti, and a remainder containing of 48 to 70 atomic % of Nb and inevitable impurities; and (b') an alloy structure where fine particles of an Ni—Ti(Nb) intermetallic compound formed of a solid solution of an Ni—Ti intermetallic compound, in which part of the Ti thereof is replaced by Nb, are dispersed in a microstructure made of an Nb-based solid solution alloy formed of a solid solution of Ni and Ti in Nb.

EFFECTS OF THE INVENTION

Due to the Ni—Ti(Nb) intermetallic compound in the microstructure having high mechanical strength, the hydrogen permeation/separation thin membrane (I) of the present invention can be made into a thin membrane having a thickness of 0.07 mm or less. In addition, due to the improvement in hydrogen permeation/separation performance owing to the achievement of a thin membrane together with the excellent hydrogen permeation/separation performance exhibited by the Nb-based solid solution alloy that is uniformly dispersed in the microstructure as fine particles, excellent hydrogen permeation/separation performance can be achieved for a long time when the thin membrane is used in various chemical reactors.

Further, due to the dispersion of fine particles of an Ni—Ti(Nb) intermetallic compound in the microstructure made of an Nb-based solid solution alloy exhibiting excellent hydrogen permeation/separation performance, the hydrogen permeation/separation thin membrane (II) of the present invention is ensured to have high mechanical strength, and as a result, can be made into a thin membrane having a thickness of 0.07 mm or less. In addition, due to the improvement in hydrogen permeation/separation performance owing to the achievement of thin membrane together with the excellent hydrogen permeation/separation performance exhibited by the microstructure made of the Nb-based solid solution alloy, the thin membrane exhibits even higher performance in the hydrogen permeation/separation for a long time.

Figure 1:
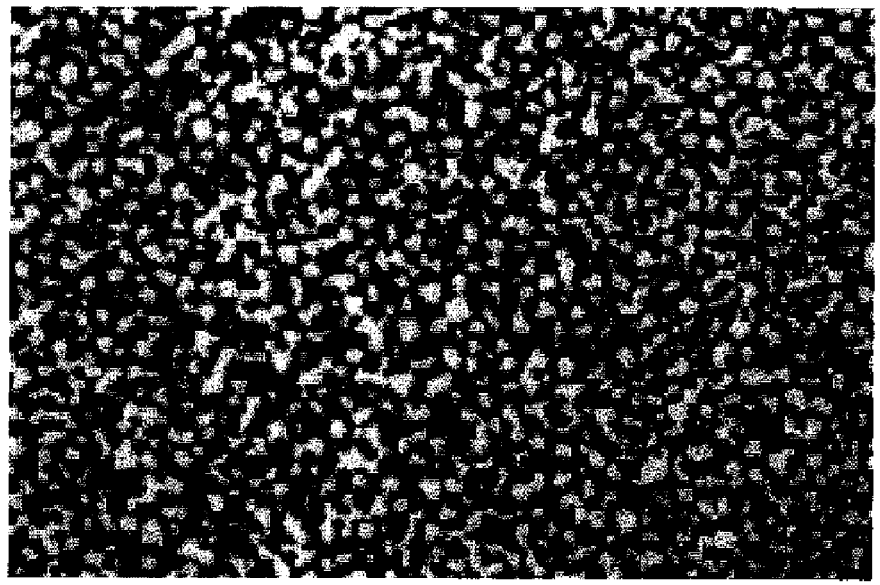
FIG. 1 is a photograph of a structure of an Ni—Ti—Nb alloy constituting a present invention hydrogen permeation thin membrane (I)-19 taken by a scanning electron microscope (magnification: 2500×).

Next, the reasons for limiting the composition of an Ni—Ti—Nb alloy constituting the hydrogen permeation/ separation thin membrane (I) of the present invention as described above will be explained.

(1) Nb

The Nb component has the effects as described above. That is, Nb is contained in the Ni—Ti intermetallic compound by replacing a part of the Ti thereof to form the Ni—Ti(Nb) intermetallic compound that constitutes the microstructure so as to improve the performance of the microstructure in hydrogen permeation/separation, and also forms an Nb-based solid solution alloy formed of a solid solution of Ni and Ti in Nb, and is dispersed in the microstructure as fine particles to exhibit excellent hydrogen permeation/separation performance. However, when the Nb content is less than 10 atomic %, the desired excellent hydrogen permeation/separation performance cannot be achieved even when the thickness of the thin membrane is reduced to 0.07 mm or less. On the other hand, when the Nb content exceeds 47 atomic %, it becomes impossible to reliably secure the aforementioned alloy structure. For these reasons, the Nb content is determined to be 10 to 47 atomic %.

(2) Ti and Ni

The Ti and Ni components have the following effects. That is, Ti and Ni form the Ni—Ti(Nb) intermetallic compound that constitutes the microstructure and improves the mechanical strength of the thin membrane so as to enable the achievement of a thin membrane having a thickness of 0.07 mm or less for practical use, and also forms a solid solution by being incorporated in the Nb-based solid solution alloy and dispersed in the microstructure as fine particles to enhance the mechanical strength of the alloy. However, when either the Ti content is less than 20 atomic % or the Ni content is less than 20 atomic %, the desired mechanical strength cannot be secured for the thin membrane, and thus the thin membrane having a thickness of 0.07 mm or less becomes difficult to be applied for practical use. On the other hand, when either the Ti content exceeds 52 atomic % or the Ni content exceeds 48 atomic %, a reduction in the hydrogen permeation/separation performance cannot be avoided. For these reasons, the Ti content and the Ni content are determined to be 20 to 52 atomic % and 20 to 48 atomic %, respectively.

Next, the reasons for limiting the composition of an Nb—Ti—Ni alloy constituting the hydrogen permeation/separation thin membrane (II) of the present invention as described above will be explained.

(1') Nb

The Nb component has the effects as described above. That is, Nb forms a microstructure constituted from an Nb-based solid solution alloy that is formed of a solid solution of Ni and Ti in Nb, and exhibits excellent hydrogen permeation/separation performance, and is also contained in the Ni—Ti intermetallic compound by replacing a part of the Ti thereof to form fine particles of the Ni—Ti(Nb) intermetallic compound so as to improve the performance of the fine particles in hydrogen permeation/separation. However, when the Nb content is less than 48 atomic %, it becomes difficult to reliably ensure the aforementioned alloy structure, and thus membrane properties are likely to vary. On the other hand, when the Nb content exceeds 70 atomic %, the proportion of dispersed fine particles of the Ni—Ti(Nb) intermetallic compound declines rapidly. As a result, the mechanical strength of the thin membrane is reduced and it becomes impossible to provide a thin membrane having a thickness of 0.07 mm or less for practical use. For these reasons, the Nb content is determined to be 48 to 70 atomic %.

(2') Ti and Ni

The Ti and Ni components have the following effects. That is, Ti and Ni form fine particles of the Ni—Ti(Nb) intermetallic compound dispersed in the microstructure and improve the mechanical strength of the thin membrane so as to enable the achievement of a thin membrane having a thickness of 0.07 mm or less for practical use, and also form a solid solution to be incorporated in the Nb-based solid solution alloy that constitutes the microstructure to enhance the mechanical strength of the alloy. However, when either the Ti content is less than 15 atomic % or the Ni content is less than 10 atomic %, the desired mechanical strength cannot be secured for the thin membrane, and thus the thin membrane having a thickness of 0.07 mm or less becomes difficult to be applied for practical use. On the other hand, when either the Ti content exceeds 33 atomic % or the Ni content exceeds 32 atomic %, a reduction in the hydrogen permeation/separation performance cannot be avoided. For these reasons, the Ti content and the Ni content are determined to be 15 to 33 atomic % and 10 to 32 atomic %, respectively.

BEST MODE FOR CARRYING OUT THE INVENTION

Next, the hydrogen permeation/separation thin membranes (I) and (II) of the present invention will be described in detail with reference to the following Examples.

EXAMPLES

<Hydrogen Permeation/Separation Thin Membrane (I)>

A highly pure Nb shot material of 99.9% purity, a highly pure Ni shot material of 99.9% purity, and a highly pure Ti sponge material of 99.5% purity, were used as raw materials. These raw materials were blended so as to achieve the proportions shown in Table 1 and they were made into an ingot by arc melting in a highly pure Ar atmosphere. This ingot was cut into a 20 mm square and was charged into a graphite crucible, in which a slit having a dimension of 20 mm (length)×0.3 mm (width) was formed at its bottom. The ingot was remelted in an argon atmosphere under reduced pressure of 0.06 MPa in a high frequency induction heating furnace and the resulting molten alloy was sprayed from the aforementioned slit at an injection pressure of 0.05 MPa onto the surface of a water-cooled copper roll rotating at a roll rate of 20 m/sec to form cast foil materials of the Ni—Ti—Nb alloy all having a plane dimension of 20 m (length)×20 mm (width) but also having individual average thicknesses (the average of thickness measured at 5 arbitrary points) indicated in Table 1. Next, these foil materials were charged into a vacuum furnace and subjected to a refining heat treatment in a vacuum of $10^{-2}$ Pa or less under the conditions where the foil materials were retained at the respective predetermined temperatures within the range of 300 to 1,100° C. for 5 hours followed by the furnace cooling. After the refining heat treatment, the foil materials were cut out into pieces having a plane dimension of 20 mm (width)×60 mm (length) to produce hydrogen permeation/separation thin membranes (I)-1 to (I)-24 of the present invention (hereafter, these membranes are referred to as the present invention hydrogen permeation thin membranes).

In addition, for the sake of comparison, conventional hydrogen permeation/separation membranes (hereinafter referred to as the conventional hydrogen permeation membranes) (I)-1 to (I)-10 made of thin plate materials of casting cut outs were produced as follows. A highly pure Nb shot material of 99.9% purity, a highly pure Ni shot material of 99.9% purity, and a highly pure Ti sponge material of 99.5% purity, were used as raw materials. These raw materials were blended so as to achieve the proportions shown in Table 2 and they were subjected to an arc melting process in a highly pure Ar atmosphere and cast to be made into Ni—Ti—Nb alloy ingots having a dimension of 80 mm (diameter)×10 mm (thickness). Thin plate materials all having a plane dimension of 20 mm (width)×60 mm (length) but also having individual average thicknesses (the average of thickness measured at 5 arbitrary points) indicated in Table 2 were cut out from these ingots by electrical discharge machining, thereby obtaining the conventional hydrogen permeation membranes.

Figure 2:
FIG. 2 is a photograph of a structure of an Ni—Ti—Nb alloy constituting a conventional hydrogen permeation membrane (I)-8 taken by a scanning electron microscope (magnification: 2500×).

With respect to the present invention hydrogen permeation thin membranes (I)-1 to (I)-24 and the conventional hydrogen permeation membranes (I)-1 to (I)-10 obtained above, the compositions were measured using an energy dispersive X-ray fluorescence analyzer, and all the results showed substantially the same analysis values as the compositions indicated in Tables 1 and 2. Further, with respect to the present invention hydrogen permeation thin membranes (I)-1 to (I)-24 and the conventional hydrogen permeation membranes (I)-1 to (I)-10 obtained above, the structures were observed using a scanning electron microscope and an X-ray diffractometer. As a result, the present invention hydrogen permeation thin membranes (I)-1 to (I)-24 showed an alloy structure where fine particles of an Nb-based solid solution alloy formed of a solid solution of Ni and Ti in Nb were dispersed in a microstructure made of an Ni—Ti(Nb) intermetallic compound formed of a solid solution of an Ni—Ti intermetallic compound, in which part of the Ti thereof was replaced by Nb, as shown by the alloy structure of the present invention hydrogen permeation thin membrane (I)-19 in FIG. 1. On the other hand, all the conventional hydrogen permeation membranes (I)-1 to (I)-10 showed an alloy structure where a primary NbTi phase was dispersed in a microstructure made of a eutectic structure of a solid solution of Ni in an NbTi phase and a solid solution of Nb in an NiTi phase, as shown by the alloy structure of the conventional hydrogen permeation membrane (I)-8 in FIG. 2.

Figure 5:
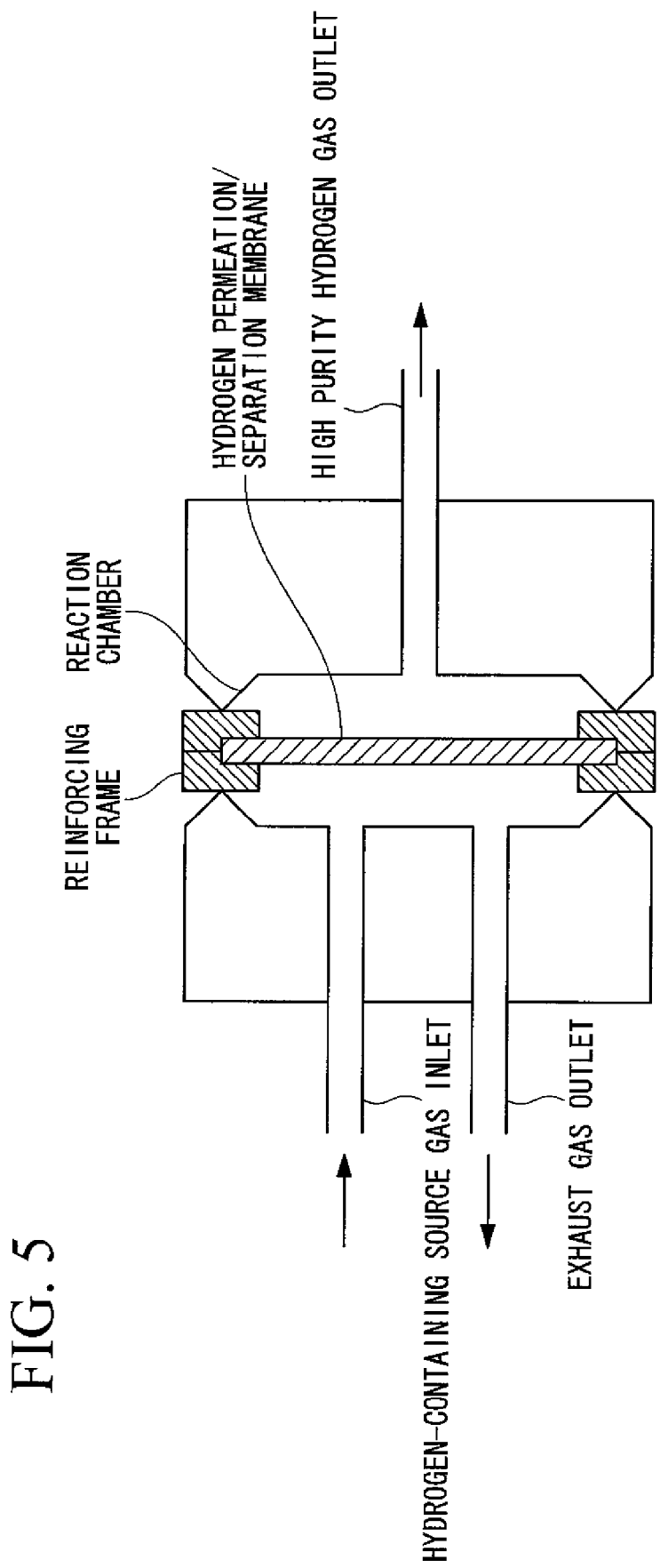
FIG. 5 is a schematic diagram showing an example of a high-performance hydrogen purifier.

Subsequently, a Pd thin film having a thickness of 0.1 μm was formed on both surfaces of the present invention hydrogen permeation thin membranes (I)-1 to (I)-24 and the conventional hydrogen permeation membranes (I)-1 to (I)-10 by deposition using a sputtering method (alternatively, the film may be formed by an electroplating process). The resulting membranes were sandwiched by two copper-made reinforcing frames having a dimension of 20 mm (transverse outer dimension)×60 mm (longitudinal outer dimension)×5 mm (frame width)×0.5 mm (frame thickness) from both sides and the respective permeation membranes were placed in a reaction chamber of a hydrogen permeability evaluation apparatus having the same structure as that of the high-performance hydrogen purifier shown in FIG. 5 while being fixed to the reinforcing frames. The inside of the reaction chamber was heated to 300° C. and hydrogen gas was introduced to the left-hand chamber of the reaction chamber to first set the internal pressure of the left-hand and right hand chambers of the reaction chamber to 0.1 MPa. Then, while maintaining the internal pressure of the right-hand chamber at 0.1 MPa, the internal pressure of the left-hand chamber was increased at a rate of 0.1 MPa per 5 minutes to 0.7 MPa for the present invention hydrogen permeation thin membranes (I)-1 to (I)-7 and the conventional hydrogen permeation membranes (I)-1 to (I)-2, 0.5 MPa for the present invention hydrogen permeation thin membranes (I)-8 to (I)-24 and the conventional hydrogen permeation membranes (I)-3 to (I)-9, and 0.3 MPa for the conventional hydrogen permeation membranes (I)-10. Flow rates of the hydrogen gas permeated (indicated in Tables 1 and 2 as the flow rates of permeated hydrogen at the initial stage) were measured using a gas flow meter at the time point where the membranes were retained for 1 hour under the abovementioned conditions. Further, flow rates of the hydrogen gas permeated were measured at the time point where the membranes were retained for another 20 hours (indicated in Tables 1 and 2 as the flow rates of permeated hydrogen at the later stage) under the same conditions (that is, the membranes were retained under the conditions where the internal pressure of 0.1 MPa in the right-hand chamber, the internal pressure in the left-hand chamber increased to 0.7 MPa, 0.5 MPa, and 0.3 MPa, respectively, from the time point where the membranes were retained under the same conditions for 1 hour). These measurement results are shown in Tables 1 and 2.

TABLE 1

| Type | | Composition (atomic %) | | | Average thickness of cast foil material (μm) | Flow rate of permeated hydrogen (ml/min) | |
|---|---|---|---|---|---|---|---|
| | | Nb | Ti | Ni | | Initial stage | Later stage |
| Present invention hydrogen permeation thin membrane (I) | (I)-1 | 10 | 45 | Remainder (45) | 28 | 34 | 32 |
| | (I)-2 | 12 | 52 | Remainder (36) | 20 | 51 | 48 |
| | (I)-3 | 14 | 38 | Remainder (48) | 25 | 48 | 46 |
| | (I)-4 | 16 | 42 | Remainder (42) | 38 | 34 | 32 |
| | (I)-5 | 18 | 35 | Remainder (47) | 26 | 59 | 55 |
| | (I)-6 | 19 | 49 | Remainder (32) | 29 | 49 | 46 |
| | (I)-7 | 20 | 38 | Remainder (42) | 32 | 52 | 49 |
| | (I)-8 | 23 | 44 | Remainder (33) | 42 | 34 | 32 |
| | (I)-9 | 25 | 31 | Remainder (44) | 39 | 45 | 42 |
| | (I)-10 | 27 | 36 | Remainder (37) | 41 | 47 | 43 |
| | (I)-11 | 28 | 42 | Remainder (30) | 31 | 64 | 59 |
| | (I)-12 | 29 | 31 | Remainder (40) | 42 | 52 | 49 |
| | (I)-13 | 31 | 33 | Remainder (36) | 54 | 45 | 42 |
| | (I)-14 | 32 | 37 | Remainder (31) | 47 | 54 | 50 |
| | (I)-15 | 34 | 29 | Remainder (37) | 43 | 67 | 62 |
| | (I)-16 | 35 | 33 | Remainder (32) | 40 | 75 | 69 |
| | (I)-17 | 37 | 34 | Remainder (29) | 44 | 76 | 70 |
| | (I)-18 | 39 | 38 | Remainder (23) | 40 | 89 | 82 |
| | (I)-19 | 40 | 30 | Remainder (30) | 38 | 99 | 91 |
| | (I)-20 | 41 | 25 | Remainder (34) | 59 | 66 | 61 |
| | (I)-21 | 43 | 33 | Remainder (24) | 53 | 77 | 71 |
| | (I)-22 | 44 | 20 | Remainder (36) | 46 | 92 | 84 |
| | (I)-23 | 45 | 29 | Remainder (26) | 56 | 77 | 70 |
| | (I)-24 | 47 | 33 | Remainder (20) | 68 | 67 | 61 |

TABLE 2

| Type | | Composition (atomic %) | | | Average thickness of thin plate materials of casting cut outs (μm) | Flow rate of permeated hydrogen (ml/min) | |
|---|---|---|---|---|---|---|---|
| | | Nb | Ti | Ni | | Initial stage | Later stage |
| Conventional hydrogen permeation membrane (I) | (I)-1 | 11 | 50 | Remainder (39) | 118 | 8 | 8 |
| | (I)-2 | 16 | 42 | Remainder (42) | 120 | 19 | 18 |
| | (I)-3 | 22 | 39 | Remainder (39) | 120 | 14 | 13 |
| | (I)-4 | 28 | 40 | Remainder (32) | 125 | 14 | 13 |
| | (I)-5 | 29 | 31 | Remainder (40) | 117 | 15 | 14 |
| | (I)-6 | 33 | 39 | Remainder (28) | 122 | 14 | 13 |
| | (I)-7 | 36 | 30 | Remainder (34) | 115 | 15 | 14 |
| | (I)-8 | 40 | 31 | Remainder (29) | 123 | 16 | 14 |
| | (I)-9 | 43 | 31 | Remainder (26) | 125 | 11 | 9 |
| | (I)-10 | 48 | 26 | Remainder (26) | 115 | 13 | 11 |

DETAILED DESCRIPTION OF THE INVENTION

As shown in Tables 1 and 2, the present invention hydrogen permeation thin membranes (I)-1 to (I)-24 had high mechanical strength secured by the Ni—Ti(Nb) intermetallic compound in the microstructure and could be made into the thin membranes having a thickness of 0.07 mm or less, and thus exhibited excellent hydrogen permeation/separation performance for a long time together with the excellent hydrogen permeation/separation performance exhibited by the Nb-based solid solution alloy dispersed in the microstructure as fine particles, and showed excellent durability (useful life). On the other hand, it is apparent that all the conventional hydrogen permeation membranes (I)-1 to (I)-10 could not be made into the membranes having a thickness of 0.1 mm or less due to their mechanical strength, and thus they had low performance in terms of the hydrogen permeation/separation.

<Hydrogen Permeation/Separation Thin Membrane (II)>

A highly pure Nb shot material of 99.9% purity, a highly pure Ni shot material of 99.9% purity, and a highly pure Ti sponge material of 99.5% purity, were used as raw materials. These raw materials were blended so as to achieve the proportions indicated in Table 3 and they were made into an ingot by arc melting in a highly pure Ar atmosphere. This ingot was cut into a 20 mm square and was charged into a graphite crucible, in which a slit having a dimension of 20 mm (length)×0.3 mm (width) was formed at its bottom. The ingot was remelted in an argon atmosphere under reduced pressure of 0.06 MPa in a high frequency induction heating furnace and the resulting molten alloy was sprayed from the aforementioned slit at an injection pressure of 0.05 MPa onto the surface of a water-cooled copper roll rotating at a roll rate of 20 m/sec to form cast foil materials of the Nb—Ti—Ni alloy all having a plane dimension of 20 m (length)×20 mm (width) but also having individual average thicknesses (the average of thickness measured at 5 arbitrary points) indicated in Table 3. Next, these foil materials were charged into a vacuum furnace and subjected to a refining heat treatment in a vacuum of $10^{-2}$ Pa or less under the conditions where the foil materials were retained at the respective predetermined temperatures within the range of 300 to 1,100° C. for 5 hours followed by the furnace cooling. After the refining heat treatment, the foil materials were cut out into pieces having a plane dimension of 20 mm (width)×60 mm (length) to produce hydrogen permeation/separation thin membranes (II)-1 to (II)-13 of the present invention (hereinafter, these membranes are referred to as the present invention hydrogen permeation thin membranes).

In addition, for the sake of comparison, conventional hydrogen permeation/separation membranes (hereinafter referred to as the conventional hydrogen permeation membrane) (II)-1 to (II)-10 made of thin plate materials of casting cut outs were produced as follows. A highly pure Nb shot material of 99.9% purity, a highly pure Ni shot material of 99.9% purity, and a highly pure Ti sponge material of 99.5% purity, were used as raw materials. These raw materials were blended so as to achieve the proportions indicated in Table 3 and they were subjected to an arc melting process in a highly pure Ar atmosphere and cast to be made into Nb—Ti—Ni alloy ingots having a dimension of 80 mm (diameter)×10 mm (thickness). Thin plate materials all having a plane dimension of 20 mm (width)×60 mm (length) but also having individual average thicknesses (the average of thickness measured at 5 arbitrary points) indicated in Table 3 were cut out from these ingots by electrical discharge machining, thereby obtaining the conventional hydrogen permeation membranes.

Figure 3:
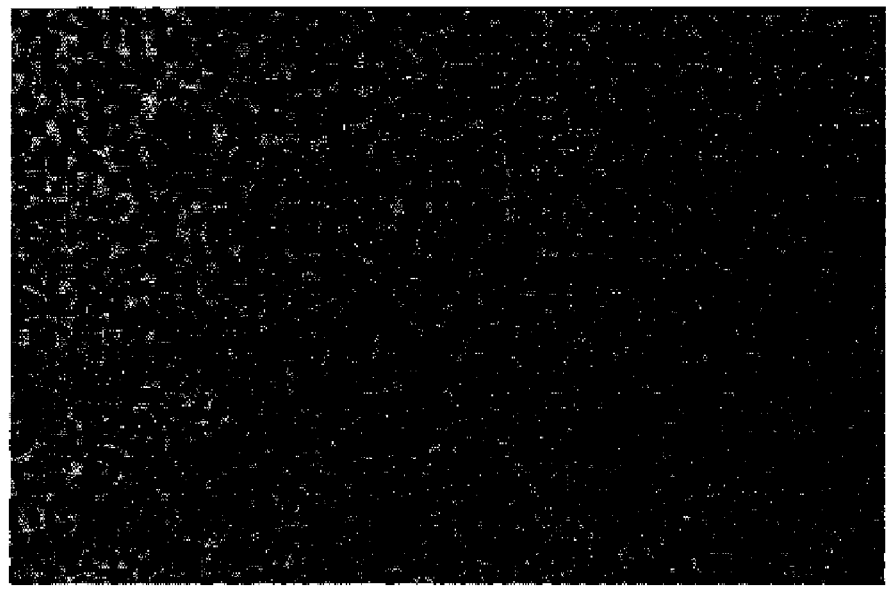
FIG. 3 is a photograph of a structure of an Nb—Ti—Ni alloy constituting a present invention hydrogen permeation thin membrane (II)-6 taken by a scanning electron microscope (magnification: 4000×).
Figure 4:
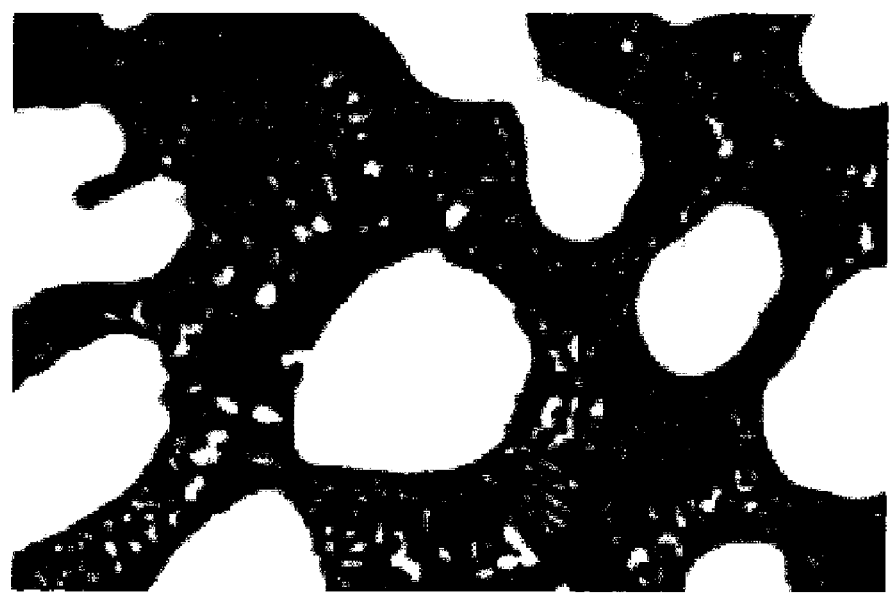
FIG. 4 is a photograph of a structure of an Ni—Ti—Nb alloy constituting a conventional hydrogen permeation membrane (II)-8 taken by a scanning electron microscope (magnification: 4000×).

With respect to the present invention hydrogen permeation thin membranes (II)-1 to (II)-13 and the conventional hydrogen permeation membranes (II)-1 to (II)-10 obtained above, the compositions were measured using an energy dispersive X-ray fluorescence analyzer, and all the results showed substantially the same analysis values as the compositions indicated in Table 3. Further, with respect to the present invention hydrogen permeation thin membranes (II)-1 to (II)-13 and the conventional hydrogen permeation membranes (II)-1 to (II)-10 obtained above, the structures were observed using a scanning electron microscope and an X-ray diffractometer. As a result, the present invention hydrogen permeation thin membranes (II)-1 to (II)-13 showed an alloy structure where fine particles of an Ni—Ti(Nb) intermetallic compound formed of a solid solution of Nb in an Ni—Ti intermetallic compound by replacing part of the Ti thereof were dispersed in a microstructure made of an Nb-based solid solution alloy formed of a solid solution of Ni and Ti in Nb, as shown by the alloy structure of the present invention hydrogen permeation thin membrane (II)-6 in FIG. 3. On the other hand, all the conventional hydrogen permeation membranes (II)-1 to (II)-10 showed an alloy structure where a primary NbTi phase was dispersed in a microstructure made of a eutectic structure of a solid solution of Ni in an NbTi phase and a solid solution of Nb in an NiTi phase, as shown by the alloy structure of the conventional hydrogen permeation membrane (II)-8 in FIG. 4.

Subsequently, a Pd thin film having a thickness of 0.1 μm was formed on both surfaces of the present invention hydrogen permeation thin membranes (II)-1 to (II)-13 and the conventional hydrogen permeation membranes (II)-1 to (II)-10 by deposition using a sputtering method (alternatively, the film may be formed by an electroplating process). The resulting membranes were sandwiched by two copper-made reinforcing frames having a dimension of 20 mm (transverse outer dimension)×60 mm (longitudinal outer dimension)×5 mm (frame width)×0.5 mm (frame thickness) from both sides and the respective permeation membranes were placed in a reaction chamber of a hydrogen permeability evaluation apparatus having the same structure as that of the high-performance hydrogen purifier shown in FIG. 5 while being fixed to the reinforcing frames. The inside of the reaction chamber was heated to 300° C. and hydrogen gas was introduced to the left-hand chamber of the reaction chamber to first set the internal pressure of the left-hand and right hand chambers of the reaction chamber to 0.1 MPa. Then, while maintaining the internal pressure of the right-hand chamber at 0.1 MPa, the internal pressure of the left-hand chamber was increased at a rate of 0.1 MPa per 5 minutes to 0.3 MPa for all the hydrogen permeation thin membranes of the present invention (II)-1 to (II)-13 and the conventional hydrogen permeation membrane (II)-10, 0.7 MPa for the conventional hydrogen permeation membranes (II)-1 to (II)-2, and 0.5 MPa for the conventional hydrogen permeation membranes (II)-3 to (II)-9. Flow rates of the hydrogen gas permeated (shown in Table 3 as the flow rates of permeated hydrogen at the initial stage) were measured using a gas flow meter at the time point where the membranes were retained for 1 hour under the abovementioned conditions. Moreover, flow rates of the hydrogen gas permeated were measured at the time point where the membranes were retained for another 20 hours under the same conditions (indicated in Table 3 as the flow rates of permeated hydrogen at the later stage). These measurement results are shown in Table 3.

solid solution alloy in the microstructure, the membranes exhibited even higher performance in the hydrogen permeation/separation for a long time. On the other hand, it is apparent that none of the conventional hydrogen permeation membranes (II)-1 to (II)-10 could be made into the membranes having a thickness of 0.1 mm or less due to their mechanical strength, and thus they had low performance in the hydrogen permeation/separation.

INDUSTRIAL APPLICABILITY

The hydrogen permeation/separation thin membrane of the present invention is constituted of an Ni—Ti—Nb alloy or Nb—Ti—Ni alloy having high mechanical strength, and can be made into a thin membrane having a thickness of 0.07 mm or less, and thus exhibits excellent hydrogen permeation/separation performance for a long time when applied to practical use. Accordingly, the membrane satisfactorily meets the demands of various chemical reactors with higher performance, in which a hydrogen permeation/separation membrane is used as a structural member. Therefore, the present invention is extremely useful industrially.

The invention claimed is:
1. A hydrogen permeation/separation thin membrane comprising a Ni—Ti—Nb alloy,
   said Ni—Ti—Nb alloy being a cast foil material obtained by roll quenching to a thickness of 0.07 mm or less, and then being subjected to a refining heat treatment, and
   said Ni—Ti—Nb alloy having:

TABLE 3

| Type | | Composition (atomic %) | | | Average thickness of cast foil material (μm) | Flow rate of permeated hydrogen (ml/min) | |
|---|---|---|---|---|---|---|---|
| | | Ni | Ti | Nb | | Initial stage | Later stage |
| Present invention hydrogen permeation thin membrane (II) | (II)-1 | 26 | 26 | Remainder (48) | 35 | 79 | 72 |
| | (II)-2 | 17 | 33 | Remainder (50) | 61 | 47 | 43 |
| | (II)-3 | 32 | 18 | Remainder (50) | 61 | 48 | 43 |
| | (II)-4 | 23 | 26 | Remainder (51) | 54 | 55 | 50 |
| | (II)-5 | 17 | 30 | Remainder (53) | 51 | 61 | 55 |
| | (II)-6 | 25 | 22 | Remainder (53) | 42 | 74 | 67 |
| | (II)-7 | 20 | 25 | Remainder (55) | 59 | 55 | 50 |
| | (II)-8 | 21 | 20 | Remainder (59) | 60 | 58 | 52 |
| | (II)-9 | 15 | 25 | Remainder (60) | 55 | 65 | 59 |
| | (II)-10 | 16 | 22 | Remainder (62) | 43 | 86 | 77 |
| | (II)-11 | 16 | 18 | Remainder (66) | 61 | 65 | 58 |
| | (II)-12 | 10 | 22 | Remainder (68) | 67 | 76 | 65 |
| | (II)-13 | 15 | 15 | Remainder (70) | 70 | 76 | 64 |
| Conventional hydrogen permeation membrane (II) | (II)-1 | 39 | 50 | Remainder (11) | 118* | 8 | 8 |
| | (II)-2 | 42 | 42 | Remainder (16) | 120* | 19 | 18 |
| | (II)-3 | 39 | 39 | Remainder (22) | 120* | 14 | 13 |
| | (II)-4 | 32 | 40 | Remainder (28) | 125* | 14 | 13 |
| | (II)-5 | 40 | 31 | Remainder (29) | 117* | 15 | 14 |
| | (II)-6 | 28 | 39 | Remainder (33) | 122* | 14 | 13 |
| | (II)-7 | 34 | 30 | Remainder (36) | 115* | 15 | 14 |
| | (II)-8 | 29 | 31 | Remainder (40) | 123* | 16 | 14 |
| | (II)-9 | 26 | 31 | Remainder (43) | 125* | 18 | 16 |
| | (II)-10 | 26 | 26 | Remainder (48) | 115* | 13 | 11 |

(In the table, the symbol* indicates "thin plate materials of casting cut outs")

As shown in Table 3, all the present invention hydrogen permeation thin membranes (II)-1 to (II)-13 had high mechanical strength secured by the fine particles of the Ni—Ti(Nb) intermetallic compound dispersed in the microstructure and could be made into the thin membranes having a thickness of 0.07 mm or less. Accordingly, further improvement in the hydrogen permeation/separation performance was achieved, and together with the excellent hydrogen permeation/separation performance exhibited by the Nb-based (a) a composition consisting of 10 to 47 atomic % of Nb, 20 to 52 atomic % of Ti, and a remainder containing 20 to 48 atomic % of Ni and inevitable impurities; and
(b) an alloy structure where fine particles of a Nb-based solid solution alloy, in which Nb forms a solid solution with Ni and Ti, are dispersed in a basic structure made of a Ni—Ti(Nb) intermetallic compound formed of a solid solution of a Ni—Ti intermetallic compound, in which part of the Ti thereof is replaced by Nb.

2. A hydrogen permeation/separation thin membrane comprising a Nb—Ti—Ni alloy, said Nb—Ti—Ni alloy being a cast foil material obtained by roll quenching to a thickness of 0.07 mm or less, and then being subjected to a refining heat treatment, and said Nb—Ti—Ni alloy having:

(a') a composition consisting of 10 to 32 atomic % of Ni, 15 to 33 atomic % of Ti, and a remainder containing 48 to 70 atomic % of Nb and inevitable impurities; and (b') an alloy structure where fine particles of a Ni—Ti(Nb) intermetallic compound formed of a solid solution of a Ni—Ti intermetallic compound, in which part of the Ti thereof is replaced by Nb, are dispersed in a basic structure made of a Nb-based solid solution alloy, in which Nb forms a solid solution with Ni and Ti.

3. A hydrogen permeation/separation thin membrane according to claim 1, wherein roll quenching is performed under conditions where a molten alloy comprising Nb, Ni and Ti is sprayed from a slit having a dimension of 20 mm in length and 0.3 mm in width at an injection pressure of 0.05 MPa onto the surface of a water-cooled copper roll rotating at a roll rate of 20 m/sec to form cast foil materials of the Ni—Ti—Nb alloy.

4. A hydrogen permeation/separation thin membrane according to claim 1, wherein the refining heat treatment is performed in a vacuum of $10^{-2}$ Pa or less under the conditions where the foil material is retained at a predetermined temperature within the range of 300 to 1,100° C. for 5 hours.

5. A hydrogen permeation/separation thin membrane according to claim 2, wherein roll quenching is performed under conditions where a molten alloy comprising Nb, Ni and Ti is sprayed from a slit having a dimension of 20 mm in length and 0.3 mm in width at an injection pressure of 0.05 MPa onto the surface of a water-cooled copper roll rotating at a roll rate of 20 m/sec to form cast foil materials of the Ni—Ti—Nb alloy.

6. A hydrogen permeation/separation thin membrane according to claim 2, wherein the refining heat treatment is performed in a vacuum of $10^{-2}$ Pa or less under the conditions where the foil material is retained at a predetermined temperature within the range of 300 to 1,100° C. for 5 hours.

* * * * *

UNITED STATES PATENT AND TRADEMARK OFFICE
CERTIFICATE OF CORRECTION

PATENT NO.        : 8,105,424 B2
APPLICATION NO.   : 12/281663
DATED             : January 31, 2012
INVENTOR(S)       : Koichi Kita, Kiyoshi Aoki and Kazuhiro Ishikawa It is certified that error appears in the above-identified patent and that said Letters Patent is hereby corrected as shown below:

Title page, item (73) Assignee: Line 1
"Mitsubishi Materials Corporation, Tokyo (JP)" should be --Mitsubishi Materials Corporation, Tokyo (JP); National University Corporation Kitami Institute of Technology, Hokkaido (JP)--

Signed and Sealed this
Twenty-third Day of October, 2012

David J. Kappos
*Director of the United States Patent and Trademark Office*